United States Patent [19]

Ward

[11] Patent Number: 4,695,368

[45] Date of Patent: Sep. 22, 1987

[54] PROCESS FOR PRODUCING HIGH OCTANE GASOLINE

[75] Inventor: John W. Ward, Yorba Linda, Calif.

[73] Assignee: Union Oil Company of California, Los Angeles, Calif.

[21] Appl. No.: 892,756

[22] Filed: Jul. 31, 1986

[51] Int. Cl.$^4$ .............................................. C10G 47/02
[52] U.S. Cl. ..................................... 208/111; 208/110; 208/112
[58] Field of Search ........ 208/111, 114, 112, 111 MC; 502/208, 213

[56] References Cited

U.S. PATENT DOCUMENTS

| | | | |
|---|---|---|---|
| 4,310,440 | 1/1982 | Wilson et al. | 208/114 |
| 4,382,878 | 5/1983 | Kehl | 208/111 |
| 4,440,871 | 4/1984 | Lok et al. | 502/214 |
| 4,483,764 | 11/1984 | Hensley, Jr et al. | 208/111 |
| 4,512,875 | 4/1985 | Long et al. | 208/114 |
| 4,564,603 | 1/1986 | Robinson et al. | 502/64 |
| 4,565,621 | 1/1986 | Ward | 208/111 |
| 4,567,029 | 1/1986 | Wilson et al. | 502/208 |
| 4,579,830 | 4/1986 | Coughlin | 502/66 |
| 4,599,477 | 7/1986 | Robinson et al. | 585/622 |
| 4,604,371 | 8/1986 | Moorehead | 502/60 |

FOREIGN PATENT DOCUMENTS

| | | | |
|---|---|---|---|
| WO86/03694 | 7/1986 | PCT Int'l Appl. | 208/112 |
| WO86/03693 | 7/1986 | PCT Int'l Appl. | 208/112 |

OTHER PUBLICATIONS

B. M. Lok, C. A. Messina, R. L. Patton, R. T. Gajek, T. R. Cannan and E. M. Flanigen, "Silicoaluminophosphate Molecular Sieves: Another New Class of Microporous Crystalline Inorganic Solids," *Journal of the American Chemical Society*, vol. 106, 1984, pp. 6092–6093.

*Primary Examiner*—Andrew H. Metz
*Assistant Examiner*—Anthony McFarlane
*Attorney, Agent, or Firm*—Yale S. Finkle; Gregory F. Wirzbicki; Dean Sandford

[57] ABSTRACT

A process for producing a high octane gasoline from a hydrocarbon feedstock in which the feedstock is contacted in the presence of hydrogen under hydrocracking conditions, preferably ammonia-rich hydrocracking conditions, with a hydrocracking catalyst comprising at least one hydrogenation metal component in combination with a crystalline, silicoaluminophosphate molecular sieve having pores defined by 12-membered rings of oxygen atoms. The preferred silicoaluminophosphate molecular sieve is SAPO-5 molecular sieve and the catalyst preferably contains both a Group VIB metal hydrogenation component, such as molybdenum or tungsten, and a Group VIII hydrogenation metal component, such as nickel or cobalt. It has been found that such a process produces gasoline boiling fractions having substantially increased research and motor octane numbers.

43 Claims, No Drawings

PROCESS FOR PRODUCING HIGH OCTANE GASOLINE

BACKGROUND OF THE INVENTION

This invention relates to a hydrocracking process and is particularly concerned with the use of a hydrocracking catalyst containing a crystalline, nonzeolitic molecular sieve to produce high octane gasoline.

Petroleum refiners often produce desirable products such as turbine fuel, diesel fuel and other middle distillate products, as well as lower boiling liquids, such as naphtha and gasoline, by hydrocracking a hydrocarbon feedstock derived from crude oil. Feedstocks most often subjected to hydrocracking are gas oils and heavy gas oils recovered from crude oil by distillation. A typical gas oil comprises a substantial proportion of hydrocarbon components boiling above about 700° F., usually at least about 50 percent by weight boiling above about 700° F. A typical heavy gas oil normally has a boiling point range between about 600° F. and 1050° F.

Hydrocracking is generally accomplished by contacting, in an appropriate reaction vessel, the gas oil or other feedstock to be treated with a suitable hydrocracking catalyst under conditions of elevated temperature and pressure in the presence of hydrogen so as to yield a product containing a distribution of hydrocarbon products desired by the refiner. Although the operating conditions within a hydrocracking reactor have some influence on the yield of the products, the hydrocracking catalyst is the prime factor in determining such yields. Typical hydrocracking catalysts for producing gasoline from gas oils and similar feedstocks are normally composed of one or more Group VIB or Group VIII metals on a support containing a zeolite having catalytic cracking activity. The octane of the gasoline produced using such catalysts has traditionally been increased by adding lead compounds to the gasoline product. Unfortunately, recent environmental legislation has restricted the use of lead additives to the extent that refiners now have difficulty producing gasoline having a sufficiently high octane number. And, when catalysts are formulated to produce higher octane gasolines to compensate for the fact that lead additives cannot be used, the catalysts quite frequently are less active than typical hydrocracking catalysts.

Accordingly, it is one of the objects of the present invention to provide a process in which the hydrocracking catalyst has a high activity for hydrocracking and produces a gasoline having a relatively high octane number. This and other objects of the invention will become more apparent in view of the following description of the invention.

SUMMARY OF THE INVENTION

In accordance with the invention, it has now been found that hydrocracking catalysts comprising a hydrogenation component and a crystalline silicoaluminophosphate containing pores defined by 12-membered rings of oxygen atoms may be used in a hydrocracking process to produce a gasoline boiling range product having an octane number significantly higher than the octane number of similar boiling fractions obtained when using conventional zeolite-based hydrocracking catalysts. It has also been found that hydrocracking catalysts containing such crystalline, large pore, nonzeolitic, silicoaluminophosphate molecular sieves are significantly more active than conventional hydrocracking catalysts when they are used in an ammonia-rich hydrocracking environment.

Normally, the hydrogenation component or components will be selected from Group VIB and/or Group VIII of the Periodic Table of Elements. As used herein "Periodic Table of Elements" refers to the version found in the inside front cover of the "Handbook of Chemistry and Physics," 65th edition, published in 1984 by the Chemical Rubber Co., Cleveland, Ohio. Preferred Group VIB metal components for use in the catalyst are molybdenum and tungsten while the preferred Group VIII metal components are the non-noble metals nickel and cobalt. The preferred silicoaluminophosphate for use in the catalyst support is SAPO-5 molecular sieve. In a preferred embodiment of the process of the invention, the catalyst used comprises a nickel component and a tungsten component on a support containing SAPO-5 molecular sieve.

DETAILED DESCRIPTION OF THE INVENTION

The catalyst used in the process of the invention comprises at least one hydrogenation metal component in combination with a support comprising a crystalline silicoaluminophosphate molecular sieve having cracking activity and comprised of pores defined by 12-membered rings of oxygen atoms. Silicoaluminophosphates are molecular sieves because they are capable of separating atoms or molecules based on the respective dimensions of the atoms or molecules. They are nonzeolitic molecular sieves because their frameworks are not formed of substantially only silica and alumina tetrahedra as are zeolitic molecular sieves such as Y zeolites and X zeolites. The silicoaluminophosphate molecular sieves suitable for use in the hydrocracking catalyst employed in the process of the invention will normally have a pore size of about 8.0 Angstroms and will nonselectively sorb n-hexane, 2,2-dimethylbutene and larger molecules. The term "pore size" as used herein refers to the diameter of the largest molecule that can be sorbed by the particular molecular sieve in question. The measurement of such diameters and pore sizes is discussed more fully in Chapter 8 of the book entitled "Zeolite Molecular Sieves" written by D. W. Breck and published by John Wiley & Sons in 1974, the disclosure of which book is hereby incorporated by references in its entirety.

The silicoaluminophosphates which may be used as a cracking component of the catalyst employed in the process of the invention are crystalline, nonzeolitic molecular sieves comprising a molecular framework of [AlO$_2$], [PO$_2$] and [SiO$_2$] tetrahedral units. The different species of silicoaluminophosphate molecular sieves are referred to by the acronym SAPO-n, where "n" denotes a specific structure type as identified by X-ray powder diffraction. The various species of silicoaluminophosphates are described in detail in U.S. Pat. No. 4,440,871, the disclosure of which is hereby incorporated by reference in its entirety. Silicoaluminophosphates have varying ring sizes and pore sizes and only those having pores defined by 12-membered rings of oxygen atoms are suitable as a component of the catalyst used in the process of the invention. The preferred silicoaluminophosphates for use in the hydrocracking catalyst are SAPO-5 molecular sieve and SAPO-37 molecular sieve with SAPO-5 molecular sieve being the most preferred. Silicoaluminophosphates are also discussed in an article entitled "Silicoaluminophosphate Molecular Sieves: Another New Class of Microporous Crystalline Inorganic Solids" published in the *Journal of American Chemical Society,* Vol. 106, pp. 6092–6093, 1984. This article is hereby incorporated by reference in its entirety. SAPO-5 and SAPO-37 molecular sieves are manufactured and sold by the Linde Division of the Union Carbide Corporation.

The silicoaluminophosphate cracking component of the catalyst used in the process of the invention is combined with a porous, inorganic refractory oxide component, or a precursor thereof, such as alumina, silica, titania, magnesia, zirconia, beryllia, silica-alumina, silica- magnesia, silica-titania, a dispersion of silica-alumina in gamma alumina, combinations of the above and the like. The preferred porous, inorganic refractory oxide components are alumina and a dispersion of silica-alumina in gamma alumina. Examples of precursors that may be used include peptized alumina, alumina gel, hydrated alumina, silica-alumina hydrogels, Ziegler-derived aluminas and silica sols. Normally, the porous, inorganic refractory oxide component or precursor thereof is mixed or comulled with the silicoaluminophosphate in amounts such that the final dry catalyst support will comprise (1) between about 2 and about 95 weight percent silicoaluminophosphate, preferably between about 10 and about 80 weight percent, and (2) between about 5 and about 98 weight percent porous, inorganic refractory oxide component, preferably between about 20 and about 90 weight percent.

The porous, inorganic refractory oxide component is mulled, normally in the form of a powder, with the silicoaluminophosphate powder. If desired, a binder such as peptized Catapal alumina may be incorporated into the mulling mixture, as also may one or more active hydrogenation metal precursors such as ammonium heptamolybdate, ammonium metatungstate, ammonium paratungstate, cobalt nitrate, nickel nitrate and the like. After mulling, the mixture is extruded through a die having openings of a cross sectional size and shape desired in the final catalyst particles. For example, the die may have circular openings to produce cylindrical extrudates, openings in the shape of 3-leaf clovers so as to produce an extrudate material similar to that shown in FIGS. 8 and 8A of U.S. Pat. No. 4,028,227, the disclosure of which is hereby incorporated by reference in its entirety, or openings in the shape of 4-leaf clovers. Among preferred shapes for the die openings are those that result in particles having surface-to-volume ratios greater than about 100 reciprocal inches. If the die opening is not circular in shape, it is normally desirable that the opening be in a shape such that the surface-to-volume ratio of the extruded particles is greater than that of a cylinder. After extrusion, the extruded catalyst particles are broken into lengths of from 1/16 to ½ inch and calcined in air at a temperature of at least 750° F., usually between about 800° F. and about 1200° F., and preferably in the range between about 900° F. and about 1050° F.

As mentioned previously, hydrogenation metal components may be mulled, either as solids or liquids, with the crystalline silicoaluminophosphate and the porous, inorganic refractory oxide component to form the catalyst extrudates before the calcination step. Alternatively, the hydrogenation metal components may be added by impregnation after the calcination step. The hydrogenation metal component or components may be impregnated into the calcined extrudates from a liquid solution containing the desired hydrogenation metal component or components in dissolved form. In some cases, it may be desirable to ion exchange the calcined extrudates with ammonium ions prior to adding the hydrogenation metal component or components. After the calcined extrudates have been impregnated with the solution containing the hydrogenation metal component or components, the particles are dried and calcined in air at a temperature normally ranging between about 800° F. and about 1100° F. to produce the finished catalyst particles.

Hydrogenation metal components suitable for incorporation into the catalyst extrudates comprise metals selected from Group VIII or Group VIB of the Periodic Table of Elements. Preferred hydrogenation metal components comprise metals selected from the group consisting of platinum, palladium, cobalt, nickel, tungsten and molybdenum. In some cases, it may be desirable that the catalyst contain at least one Group VIII metal component and at least one Group VIB metal component. When this is the case, the preferred combination will normally be a nickel and/or cobalt component with a molybdenum and/or tungsten component.

If the hydrogenation metal component consists essentially of a noble metal such as platinum or palladium, it is generally desired that the finished catalyst particles contain between about 0.05 and about 10 weight percent of the hydrogenation metal component, preferably between about 0.10 weight percent and about 3.0 weight percent, calculated as the metal. If, on the other hand, the hydrogenation metal component consists essentially of one or more non-noble metals, such as nickel or nickel and tungsten, it is normally desired that the finished catalyst particles contain between about 1.0 and about 40 weight percent of the hydrogenation metal components, preferably between about 3 weight percent and about 30 weight percent, calculated as the metal oxide.

It has been found that, when catalysts containing large pore, crystalline, silicoaluminophosphate molecular sieves as described above are used in a hydrocracking process, the resultant product will contain gasoline boiling range fractions having surprisingly high research and motor octane numbers. It has been specifically found that the motor and research octane numbers of the product fraction boiling between about 50° F. and about 185° F. will usually be at least about 1.5 units higher, typically between about 3 and 4 units higher, than the research and motor octane numbers of the same fraction obtained when using hydrocracking catalysts containing a commercially used, large pore, zeolitic molecular sieve in combination with either non-noble or noble hydrogenation metal components. Such increases in octane numbers are highly desirable in light of recent environmental legislation which will prohibit the use of lead additives to increase gasoline octane in the near future. It has also been surprisingly discovered that the nonzeolite-based catalysts discussed above can significantly increase the octane number of gasoline fractions without sacrificing activity under certain reaction conditions. In fact, it has been found that, in ammonia-rich hydrocracking atmospheres, the activity of catalysts containing large pore, crystalline, silicoaluminophosphate molecular sieves can be as much as 25° F. more active than large pore, zeolite-based catalysts containing noble or non-noble hydrogenation metal components.

In general, hydrocracking catalysts as described above may be used in the conversion of a wide variety of hydrocarbon feedstocks to hydrocarbon products of lower average boiling point and molecular weight. As used herein "hydrocarbon" refers to any compound which comprises hydrogen and carbon, and "hydrocarbon feedstock" refers to any charge stock which contains a mixture of hydrocarbon compounds and comprises greater than about 70 weight percent carbon and hydrogen, preferably greater than about 80 weight percent, calculated as the elements. The feedstocks that may be subjected to hydrocracking in accordance with the process of the invention include mineral oils and synthetic oils such as shale oil, oil derived from tar sands, coal liquids and the like. Examples of appropriate feedstocks include straight run gas oils, vacuum gas oils and catalytic cracking distillates. A typical hydrocracking feedstock normally contains between about 50 percent and about 75 percent by volume of components boiling above the desired end point of the product. In the case of gasoline, the end point will generally be in the range of about 380° F. to about 420° F. Usually, the feedstock will also contain gas oil components boiling above 550° F., and will preferably contain at least 30 volume percent of components boiling between about 600° F. and about 1000° F.

The catalysts containing large pore silicoaluminophosphate molecular sieve are usually employed in the process of the invention as a fixed bed of catalytic particulates in a hydrocracking reactor vessel into which hydrogen and the feedstock are introduced and passed in a downward direction. The reactor vessel is maintained at conditions so as to convert the feedstock into the desired product, which is normally a hydrocarbon product containing a substantial proportion of gasoline components boiling in the range between about 50° F. and about 420° F. In general, the temperature of the reaction vessel is maintained between about 450° F. and about 850° F., preferably between about 550° F. and about 800° F. The pressure will normally range between about 750 and about 3500 p.s.i.g., preferably between about 1000 and about 3000 p.s.i.g. The liquid hourly space velocity (LHSV) is typically between about 0.3 and about 5.0, preferably between 0.5 and about 3.0. The ratio of hydrogen gas to feedstock utilized will usually range between about 1000 and 10,000 scf/bbl, preferably between about 2000 and about 8000 scf/bbl as measured at 60° F. and one atmosphere. The yield of $C_4$ to 420° F. gasoline is usually at least about 50 percent, preferably at least about 70 percent by volume, on a oncethrough basis.

Since the hydrocracking catalysts described above are much more active than zeolitic-based hydrocracking catalysts in the presence of ammonia than in the absence of ammonia, it is a preferred embodiment of the invention to use the catalyst in a hydrocracking zone under ammonia-rich hydrocracking conditions. The phrase "ammonia-rich" as used herein refers to the situation where there is more than 200 ppmw ammonia, based on the feedstock, present in the hydrocracking zone, normally more than 1000 ppmw ammonia, preferably more than about 1500 ppmw ammonia. Thus, in a preferred embodiment of the hydrocracking process of the invention in which only one hydrocracking zone is utilized in series with and downstream of a hydrotreating zone, the feed to the hydrocracking zone will not be treated to remove the ammonia produced in the hydrotreating zone. If, on the other hand, the hydrocracking process is one in which there are two hydrocracking zones in series downstream of the hydrotreating zone, such as the process described in U.S. Pat. No. 4,565,621, the disclosure of which is hereby incorporated by reference in its entirety, the large pore silicoaluminophosphate-containing catalyst will normally be used in the first hydrocracking zone which directly receives the ammonia-containing effluent from the hydrotreating zone. Since ammonia is removed from the process by water scrubbing the effluent from the first hydrocracking zone before the unconverted portion of the effluent is passed to the second hydrocracking zone, the second hydrocracking zone has an essentially ammonia-free hydrocracking atmosphere in which there is normally no more than about 50 ppmw ammonia, based on the feedstock, present.

In the hydrocracking process of the invention, the effluent from the last hydrocracking zone is subjected to distillation to separate the lower boiling fractions from the higher boiling fractions which are recycled to that hydrocracking zone. A light gasoline fraction boiling in the range between about 50° F. and about 185° F. is removed from the distillation column along with a heavier gasoline fraction boiling in the range between about 185° F. and about 420° F. In conventional hydrocracking processes in which zeolite-based catalysts are used, the light gasoline fraction is sometimes passed downstream where it is subjected to isomerization to increase its research and motor octane numbers so that the fraction can be more effectively used in gasoline blending. The heavier gasoline fraction, which will normally have research and motor octane numbers somewhere in the high 50's to low 60's, is typically subjected to reforming to increase the octane numbers to values which would enable the reformed fractions to be directly used in gasoline blending. By employing the process of the invention in which a hydrocracking catalyst containing a large pore, silicoaluminophosphate molecular sieve is used in at least one hydrocracking zone, the motor and research octane numbers of the resultant light gasoline fraction will typically be sufficiently high to allow the fraction to be used directly as a gasoline blending fraction without the need for expensive isomerization. Moreover, the heavy gasoline fraction produced in such a process will possess increased research and motor octane numbers. This means that the reformer can be operated under less severe conditions to obtain the desired octane number increase while decreasing the loss of volume yield which would be incurred at the more severe reforming conditions that would otherwise be required.

The nature and objects of the invention are further illustrated by the following examples which are provided for illustrative purposes only and not to limit the invention as defined by the claims. The examples demonstrate that a hydrocracking catalyst containing a large pore, crystalline, nonzeolitic, silicoaluminophosphate molecular sieve produces light and heavy gasoline fractions with significantly increased research and motor octane numbers as compared to fractions obtained using commercial, zeolite-based, hydrocracking catalysts. The examples also show that a catalyst containing a large pore, silicoaluminophosphate molecular sieve is much more active than commercial zeolite-based catalysts when hydrocracking in the presence of ammonia, whereas a hydrocracking catalyst containing an intermediate pore, silicoaluminophosphate molecular sieve is essentially inactive for cracking in both the presence and absence of ammonia.

EXAMPLE 1

A hydrocracking catalyst containing SAPO-5 molecular sieve, a large pore silicoaluminophosphate whose pores are defined by 12-membered rings of oxygen atoms, is prepared as follows. The SAPO-5 molecular sieve is mixed with gamma alumina and Catapal alumina such that the resultant mixture comprises 70 weight percent SAPO-5 molecular sieve, 10 weight percent gamma alumina and 20 weight percent Catapal alumina. The mixture is mulled for 30 minutes and then water is added while the mixture is mulled for another 30 minutes. The mulled mixture is then extruded through a 1/16 inch diameter circular die and broken into particles varying in length from about ⅛ to about ½ inch. The extruded particles are then dried and calcined in flowing air at about 930° F. for 1.0 hour. The extruded particles are impregnated with an aqueous solution containing 0.20 grams/ml of nickel nitrate (Ni(NO$_3$)$_2$. 6H$_2$O) and 0.33 grams/ml of ammonium metatungstate (92 weight percent WO$_3$). After removing excess liquid, the particles are dried at 220° F. and, after gradual heating to 930° F., are calcined at 930° F. in flowing air for about 1.0 hour. The final catalyst contains about 4.0 weight percent nickel components, calculated as NiO, and about 22 weight percent tungsten components, calculated as WO$_3$.

EXAMPLE 2

A hydrocracking catalyst containing SAPO-11 molecular sieve, an intermediate pore silicoaluminophosphate molecular sieve whose pores are defined by 10-membered rings of oxygen atoms, is prepared as described in Example 1 except that the mulled mixture contains 80 weight percent SAPO-11 molecular sieve, 20 weight percent Catapal alumina and no gamma alumina. The final catalyst contains about 4.0 weight percent nickel components, calculated as NiO, and about 20 weight percent tungsten components, calculated as WO$_3$.

EXAMPLE 3

A hydrocracking catalyst containing a zeolitic molecular sieve is prepared according to the procedure described in Example 1 except that LZY-82 zeolite is used instead of the SAPO-5 nonzeolitic molecular sieve. The mulled mixture contains 80 weight percent LZY-82 zeolite, and 20 weight percent Catapal alumina binder. The final catalyst contains about 4.0 weight percent nickel components, calculated as NiO, and about 22 weight percent tungsten components, calculated as WO$_3$. LZY-82 zeolite is a modified, large pore zeolite whose pores are about 8.0 Angstroms in size and are defined by 12-membered rings of oxygen atoms. Thus, LZY-82 zeolite is a zeolitic analogue of SAPO-5 molecular sieve. LZY-82 zeolite is manufactured and sold by the Linde Division of the Union Carbide Corporation. The same or a substantially similar zeolite is described in detail in U.S. Pat. No. 3,929,672, the disclosure of which is hereby incorporated by reference in its entirety.

EXAMPLE 4

The catalysts prepared in Examples 1 through 3 are evaluated for hydrocracking activity along with two commercial hydrocracking catalysts as follows. About 150 ml of each catalyst is placed in a laboratory size reactor vessel and activated by passing hydrogen through the fixed bed at a pressure of about 1450 p.s.i.g. and a temperature of 700° F. The catalyst is then cooled to 450° F. and a mixture of a gas oil feed and molecular hydrogen is passed through the catalyst bed in the reactor. The reactor is maintained at 1450 p.s.i.g. with a liquid hourly space velocity of 1.7 and a hydrogen-to-oil ratio of 8000 scf/bbl. The gas oil feed is a denitrogenated, desulfurized, unconverted fraction obtained from a previous integral hydrotreating-hydrocracking operation which has an API gravity of 38.3° and a boiling range of 330° F. to 780° F. with about 14 volume percent of the feed boiling below about 400° F. To simulate hydrocracking in a hydrogen sulfide-containing atmosphere, thiophene is blended with the feedstock so as to provide a sulfur concentration therein of about 0.5 weight percent. The temperature utilized in the reactor vessel is adjusted periodically to maintain a total liquid product gravity of 49.5° API, which, by previously established correlations, corresponds to about a 60 volume percent yield of gasoline-type materials boiling below 420° F. After 100 hours of operation, the activity of the catalyst is determined by measuring the temperature in the reactor.

After each catalyst has been evaluated for hydrocracking activity in an ammonia-free atmosphere as described above, it is evaluated for hydrocracking activity under ammonia-rich conditions in a process similar to that described above except that the catalyst used is the catalyst which remains after the first test has been completed. Also, in addition to adding thiophene to the hydrocarbon feed gas oil, teriary butylamine is added to provide an ammonia concentration of about 2000 ppmw, based on the feedstock, and thereby simulate an ammonia-rich atmosphere such as that resulting from hydrotreating an organic nitrogen-containing feedstock. The operating temperature is adjusted periodically to maintain a total liquid product gravity of 47° API, which, by previously established correlations, corresponds to about a 40 volume percent yield of gasoline-type products boiling below 420° F. The operating temperature or activity after 100 hours is measured.

The effluent obtained from the reactor vessel after each run is fractionated to recover a light gasoline fraction boiling between about 50° F. and about 185° F. and a heavy gasoline fraction boiling between about 185° F. and about 420° F. The research and motor octane numbers of each of these fractions is determined, respectively, using ASTM method D2699 and ASTM method D2700. The activity and octane number data obtained from the above-described tests carried out in the presence of ammonia are set forth below in Table 1.

TABLE 1[a]

| Catalyst | Catalyst Description | Activity[b] Delta (°F.) | Light Gasoline | | Heavy Gasoline | |
|---|---|---|---|---|---|---|
| | | | Research Octane | Motor Octane | Research Octane | Motor Octane |
| Example 1 | Ni + W on SAPO-5 | −25 | 84.7 | 83.3 | 57.8 | 59.5 |
| Example 2 | Ni + W on | No | — | — | — | — |

TABLE 1[a-continued]

| Catalyst | Catalyst Description | Activity[b] Delta (°F.) | Light Gasoline | | Heavy Gasoline | |
|---|---|---|---|---|---|---|
| | | | Research Octane | Motor Octane | Research Octane | Motor Octane |
| Example 3 | SAPO-11 Ni + W on LZY-82 | Conversion −10 | 82.1 | 79.3 | 57.0 | 59.0 |
| Commercial Catalyst 1 | [c] | Reference | 80.1 | 78.9 | 57.3 | 58.8 |
| Commercial Catalyst 2 | [d] | −20 | 81.3 | 80.1 | 51.0 | 56.5 |

[a]Hydrocracking carried out in the presence of ammonia.
[b]Temperature differential, which is based on reference commercial catalyst 1, required to maintain 40 volume percent conversion to 420° F. - products.
[c]A non-noble metal hydrocracking catalyst.
[d]A noble metal hydrocracking catalyst.

As can be seen from the data in Table 1, the hydrocracking catalyst containg the SAPO-5 molecular sieve is more active than any of the other catalysts tested when the hydrocracking is carried out in the presence of ammonia. The catalyst containing the SAPO-5 molecular sieve is 25° F. more active than commercial catalyst 1, 15° F. more active than the similar catalyst of Example 3 in which LZY-82 zeolite is substituted for the nonzeolitic SAPO-5 molecular sieve, and 5° F. more active than commericial catalyst 2. The activity data obtained for the Example 2 catalyst, which contains the intermediate pore SAPO-11 molecular sieve, indicate that this catalyst has little or no hydrocracking activity since there was little if any conversion of the feedstock to lower boiling products. The high activity obtained with the Example 1 catalyst as compared to the activity obtained with the Example 3 catalyst, when both are used in the presence of ammonia, is quite unexpected since the pore size of the SAPO-5 molecular sieve used in the Example 1 catalyst is approximately the same as the pore size of the LZY-82 zeolite which is the active cracking component used in the Example 3 catalyst.

The data in Table 1 also show that the use of the catalyst containing the SAPO-5 molecular sieve results in much higher research and motor octane numbers for the light gasoline fraction, which boils between 50° F. and 185° F., as compared to those for the light gasoline fraction obtained using the catalyst of Example 3 and commercial catalysts 1 and 2. In fact, the increase in research octane ranged from a minimum of 2.6 units based on the 82.1 octane rating for the light gasoline fraction obtained using the Example 3 catalyst to a maximum of 4.6 units based upon the 80.1 octane rating for the light gasoline fraction obtained using commercial catalyst 1. Similarly, the increase in motor octane number ranged from a minimum of 3.2 units based on the 80.1 octane rating for the light gasoline fraction obtained using commercial catalyst 2 to a high of 4.4 units based on the 78.9 octane rating for the light gasoline fraction obtained using commercial catalyst 1. These increases in gasoline octane number are quite significant. The fact that the increase in octane number is directly attributable to the SAPO-5 molecular sieve is clear from a comparison of the octane data obtained using the Example 1 catalyst to that obtained using the Example 3 catalyst. The difference in these catalysts being that the Example 1 catalyst base contains 70 weight percent SAPO-5 molecular sieve whereas the Example 3 catalyst base contains 80 weight percent LZY-82 zeolite.

Inspection of the data in Table 1 relating to the octane numbers of the heavy gasoline fraction, which boils between 185° F. and 420° F., indicates that there is no significant increase in the research and motor octane numbers for the heavy gasoline fraction obtained using the Example 1 catalyst as compared to those for the heavy gasoline fractions obtained using the Example 3 catalyst and commercial catalyst 1. However, a large increase in octane numbers was observed for the heavy gasoline fraction obtained using the Example 1 catalyst compared to those for the heavy gasoline fraction obtained using commercial catalyst 2.

The activity and octane number data for the tests carried out in the absence of ammonia are set forth below in Table 2.

TABLE 2[a]

| Catalyst | Catalyst Description | Activity[b] Delta (°F.) | Light Gasoline | | Heavy Gasoline | |
|---|---|---|---|---|---|---|
| | | | Research Octane | Motor Octane | Research Octane | Motor Octane |
| Example 1 | Ni + W on SAPO-5 | +75 | 86.7 | 85.0 | 66.2 | 67.8 |
| Example 2 | Ni + W on SAPO-11 | No Conversion | — | — | — | — |
| Example 3 | Ni + W on LZY-82 | +9 | 84.9 | 81.8 | 60.8 | 61.5 |
| Commercial Catalyst 1 | [c] | Reference | 83.7 | 81.6 | 60.3 | 63.4 |
| Commercial Catalyst 2 | [d] | −60 | 83.7 | 81.8 | 54.5 | 58.5 |

[a]Hydrocracking carried out in the absence of ammonia.
[b]Temperature differential, which is based on reference commercial catalyst 1, required to maintain 60 volume percent conversion to 420° F. - products.
[c]A non-noble metal hydrocracking catalyst.
[d]A noble metal hydrocracking catalyst.

The activity data set forth in Table 2 clearly indicate that, under ammonia-deficient hydrocracking conditions, the Example 1 catalyst, which contains the SAPO-5 molecular sieve, is much less active than the catalyst of Example 3 or commercial catalysts 1 and 2.

When ammonia is absent from the hydrocracking zone, the Example 1 catalyst is 75° F. less active than commercial catalyst 1, 66° F. less active than the catalyst of Example 3, and 135° F. less active than commercial catalyst 2. The catalyst of Example 2, which contains the intermediate pore SAPO-11 molecular sieve, yielded essentially no conversion to lower boiling products in the absence of ammonia. Thus, it can be concluded from the data in Tables 1 and 2 relating to the Example 2 catalyst that a hydrocracking catalyst containing SAPO-11 molecular sieve will have little if any cracking activity in the presence or absence of ammonia.

Although the Example 1 catalyst, which contains the SAPO-5 molecular sieve, is less active than the Example 3 catalyst, which contains the LZY-82 zeolite, and commercial catalysts 1 and 2 under ammonia-deficient conditions, the data in Table 2 demonstrate that use of the Example 1 catalyst substantially increases the research and motor octane numbers of both the light and heavy gasoline fractions. As can be seen from the data, the increase in research octane for the light gasoline fraction ranged from 1.8 units based on the 84.9 octane rating for the light gasoline fraction obtained using the Example 3 catalyst to 3.0 units based on the 83.7 octane ratings for the light gasoline fractions obtained using commercial catalysts 1 and 2. The increase in motor octane number was about 3.2 units based on the octane ratings for the light gasoline fractions obtained using the Example 3 catalyst and commercial catalysts 1 and 2. In many refinery operations, such increases in octane numbers can more than compensate for the use of a lower activity catalyst.

Unlike the results obtained when hydrocracking was carried out in the presence of ammonia, the research and motor octane numbers for the heavy gasoline fraction obtained using the Example 1 catalyst were significantly higher than those for the heavy gasoline fraction produced with the catalyst of Example 3 and commercial catalyst 1. The increase in research octane number ranged from a low of about 5.3 units based on the 60.8 octane rating of the heavy gasoline fraction obtained using the Example 3 catalyst to a high of 11.7 units based on the 54.5 octane rating of the heavy gasoline fraction obtained using commercial catalyst 2. The increase in motor octane ranged from a low of 6.3 units based on the 61.5 octane rating for the the heavy gasoline fraction obtained using the Example 3 catalyst to a high of 9.3 units based on the 58.5 octane rating of the heavy gasoline fraction obtained using commercial catalyst 2.

It will be apparent from the foregoing that the use of a catalyst containing a large pore silicoaluminophosphate in a hydrocracking zone under ammonia-rich conditions results in unexpectedly high activities and the production of light gasoline fractions having substantially increased research and motor octane numbers. Moreover, the use of such a catalyst under ammonia-deficient hydrocracking conditions results in significant increases in the research and motor octane numbers of both light and heavy gasoline fractions. Thus, the process of the invention is a significant step in solving the problems associated with the legislative prohibition against the use of lead additives to increase gasoline octane numbers.

Although this invention has been primarily described in conjunction with examples and by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A hydrocracking process for producing a high octane gasoline from a hydrocarbon feedstock containing constituents boiling above about 550° F. which comprises contacting said feedstock in the presence of hydrogen and greater than about 200 ppmw ammonia, based on said feedstock, under hydrocracking conditions with a hydrocracking catalyst comprising at least one hydrogenation metal component in combination with a crystalline silicoaluminophosphate molecular sieve having pores defined by 12-membered rings of oxygen atoms.

2. A process as defined by claim 1 wherein said catalyst further comprises a porous, inorganic refractory oxide component.

3. A process as defined by claim 2 wherein said silicoaluminophosphate molecular sieve comprises SAPO-5 molecular sieve.

4. A process as defined by claim 2 wherein said silicoaluminophosphate molecular sieve comprises SAPO-37 molecular sieve.

5. A process as defined by claim 2 wherein said porous, inorganic refractory oxide component comprises alumina.

6. A process as defined by claim 2 wherein said catalyst comprises at least one hydrogenation metal component selected from Group VIB metal components and at least one hydrogenation metal component selected from Group VIII metal components.

7. A process as defined by claim 6 wherein said Group VIII metal component comprises a nickel component or a cobalt component and said Group VIB metal component comprises a tungsten component or a molybdenum component.

8. A process as defined by claim 7 wherein said Group VIII metal component comprises nickel and said Group VIB metal component comprises tungsten.

9. A process as defined by claim 8 wherein said silicoaluminophosphate molecular sieve comprises SAPO-5 molecular sieve.

10. A process as defined by claim 9 wherein said porous, inorganic refractory oxide component comprises alumina.

11. A process as defined by claim 10 further comprising the step of recovering a product hydrocarbon comprising a gasoline fraction boiling between about 50° F. and about 185° F., said gasoline fraction having research and motor octane numbers at least about 1.5 units greater than the research and motor octane numbers of a 50° F. to 185° F. boiling fraction that is obtained when said hydrocracking catalyst contains LZY-82 zeolite in lieu of said SAPO-5 molecular sieve.

12. A process as defined by claim 2 wherein said porous, inorganic refractory oxide component comprises a dispersion of silica-alumina in gamma alumina.

13. A process as defined by claim 10 wherein said feedstock is contacted with said hydrocracking catalyst in the presence of greater than about 1000 ppmw ammonia, based on said feedstock.

14. A process as defined by claim 2 wherein said hydrogenation metal component comprises a Group VIII noble metal.

15. A process as defined by claim 6 wherein said silicoaluminophosphate molecular sieve comprises SAPO-5 molecular sieve.

16. A process as defined by claim 14 wherein said hydrogenation metal component is selected from the group consisting of palladium components and platinum components.

17. A process as defined by claim 16 wherein said hydrogenation metal component comprises a palladium component.

18. A process for producing a high octane gasoline from a hydrocarbon feedstock containing constituents boiling above about 550° F. which comprises:
(a) contacting said hydrocarbon feedstock in the presence of hydrogen under hydrocracking conditions with a hydrocracking catalyst comprising at least one hydrogenation metal component in combination with a crystalline silicoaluminophosphate molecular sieve having pores defined by 12-membered rings of oxygen atoms; and
(b) recovering a product hydrocarbon comprising a gasoline fraction boiling between about 50° F. and about 420° F.

19. A process as defined by claim 18 wherein said product hydrocarbon comprises a gasoline fraction boiling between about 50° F. and about 185° F.

20. A process as defined by claim 19 wherein the research octane number of said 50° F. to 185° F. boiling gasoline fraction is at least about 1.5 units greater than the research octane number of a 50° F. to 185° F. boiling fraction that is obtained when said hydrocracking catalyst contains LZY-82 zeolite in lieu of said silicoaluminophosphate molecular sieve.

21. A process as defined by claim 19 wherein the research octane number of said 50° F. to 185° F. boiling fraction is at least about 2.0 units greater than the research octane number of a 50° F. to 185° F. boiling fraction that is obtained when said hydrocracking catalyst contains LZY-82 zeolite in lieu of said silicoaluminophosphate molecular sieve.

22. A process as defined by claim 20 wherein said hydrocracking catalyst further comprises a porous, inorganic refractory oxide component.

23. A process as defined by claim 22 wherein said silicoaluminophosphate molecular sieve comprises SAPO-5 molecular sieve.

24. A process as defined by claim 22 wherein said silicoaluminophosphate molecular sieve comprises SAPO-37 molecular sieve.

25. A process as defined by claim 23 wherein said hydrocracking catalyst comprises at least one hydrogenation metal component selected from Group VIB metal components and at least one hydrogenation metal component selected from Group VIII metal components.

26. A process as defined by claim 25 wherein said Group VIII hydrogenation metal component comprises nickel and said Group VIB hydrogenation metal component comprises tungsten.

27. A process as defined by claim 19 wherein the motor octane number of said 50° F. to 185° F. boiling fraction is at least about 3.0 units greater than the motor octane number of a 50° F. to 185° F. boiling fraction that is obtained when said hydrocracking catalyst contains LZY-82 zeolite in lieu of said silicoaluminophosphate molecular sieve.

28. A process as defined by claim 27 wherein said silicoaluminophosphate molecular sieve comprises SAPO-5 molecular sieve.

29. A process as defined by claim 28 wherein said hydrocracking catalyst comprises at least one hydrogenation metal component selected from Group VIB metal components and at least one hydrogenation metal component selected from Group VIII metal components.

30. A process as defined by claim 29 wherein said Group VIII hydrogenation metal component comprises nickel and said Group VIB hydrogenation metal component comprises tungsten.

31. A process as defined by claim 22 wherein said porous, inorganic refractory oxide component comprises a dispersion of silica-alumina in gamma alumina.

32. A process as defined by claim 25 wherein said porous, inorganic refractory oxide component comprises alumina.

33. A process as defined by claim 22 wherein said porous, inorganic refractory oxide component comprises alumina.

34. A process as defined by claim 29 wherein said hydrocracking catalyst further comprises alumina.

35. A process as defined by claim 30 wherein said hydrocracking catalyst further comprises alumina.

36. A process for producing a high octane gasoline from a hydrocarbon feedstock containing constituents boiling above about 550° F. which comprises:
(a) contacting said hydrocarbon feedstock in the presence of hydrogen and in the substantial absence of ammonia under hydrocracking conditions with a hydrocracking catalyst comprising at least one hydrogenation metal component in combination with a crystalline silicoaluminophosphate molecular sieve having pores defined by 12-membered rings of oxygen atoms; and
(b) recovering a product hydrocarbon comprising a gasoline fraction boiling between about 185° F. and about 420° F.

37. A process as defined by claim 36 wherein the research and motor octane numbers of said 185° F. to 420° F. boiling fraction are at least about 4.0 units greater than the research and motor octane numbers of a 185° F. to 420° F. boiling fraction that is obtained when said hydrocracking catalyst contains LZY-82 zeolite in lieu of said silicoaluminophosphate molecular sieve.

38. A process as defined by claim 37 wherein said silicoaluminophosphate molecular sieve comprises SAPO-5 molecular sieve.

39. A process as defined by claim 38 wherein said hydrocracking catalyst comprises at least one hydrogenation metal component selected from Group VIB metal components and at least one hydrogenation metal component selected from Group VIII metal components.

40. A process as defined by claim 39 wherein said Group VIII hydrogenation metal component comprises nickel and said Group VIB hydrogenation metal component comprises tungsten.

41. A process as defined by claim 40 wherein said hydrocracking catalyst further comprises alumina.

42. A hydrocracking process for producing a high octane gasoline from a hydrocarbon feedstock containing constituents boiling above about 550° F. which comprises contacting said feedstock in the presence of hydrogen and greater than about 200 ppmw ammonia, based on said feedstock, under hydrocracking conditions with a hydrocracking catalyst consisting essentially of a Group VIII metal component and a Group VIB meatl component in combination with (1) a crystalline silicoaluminophosphate molecular sieve having pores defined by 12-membered rings of oxygen atoms and (2) a porous, inorganic refractory oxide component.

43. A process as defined by claim 42 wherein said Group VIB metal component comprises tungsten, said Group VIII metal component comprises nickel, said silicoaluminophosphate molecular sieve comprises SAPO-5 molecular sieve and said porous, inorganic refractory oxide component comprising alumina.

* * * * *